Aug. 5, 1969 G. M. STEIN 3,460,084
INTERLEAVED ELECTRICAL WINDING STRUCTURES
Filed April 16, 1968 3 Sheets-Sheet 1
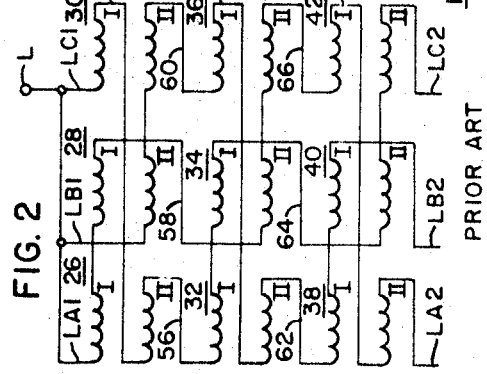
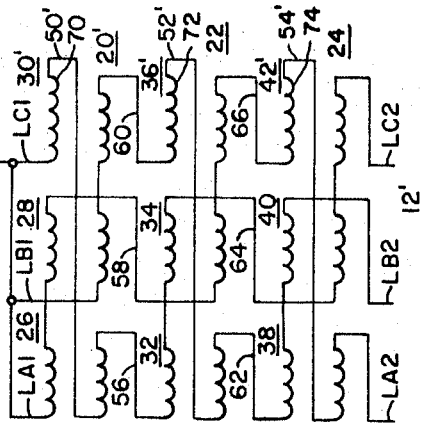
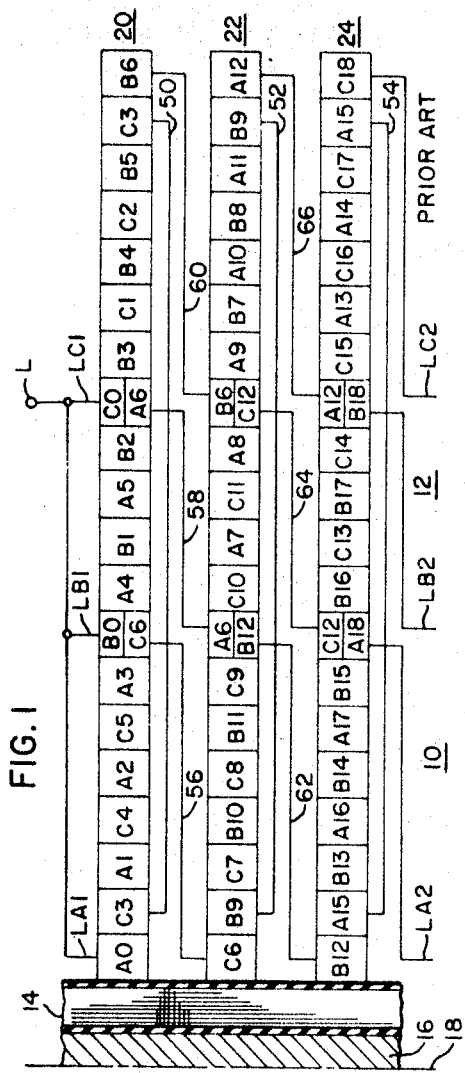
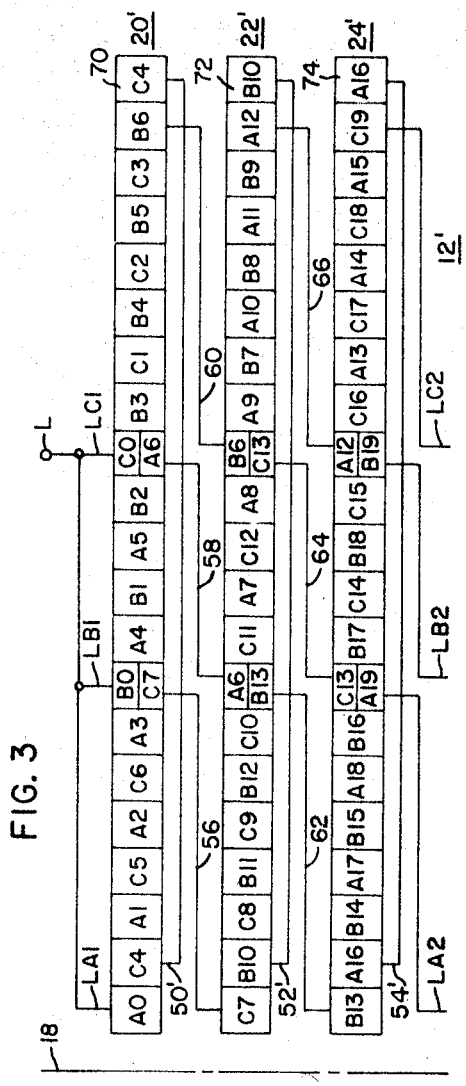

Aug. 5, 1969  G. M. STEIN  3,460,084
INTERLEAVED ELECTRICAL WINDING STRUCTURES
Filed April 16, 1968  3 Sheets-Sheet 2
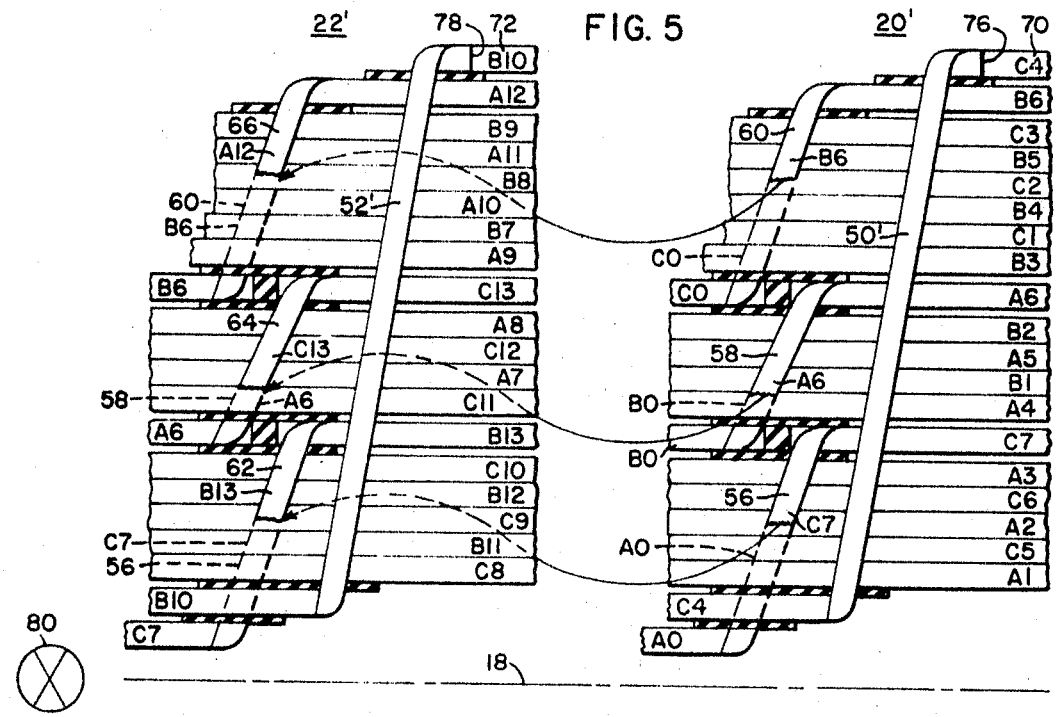
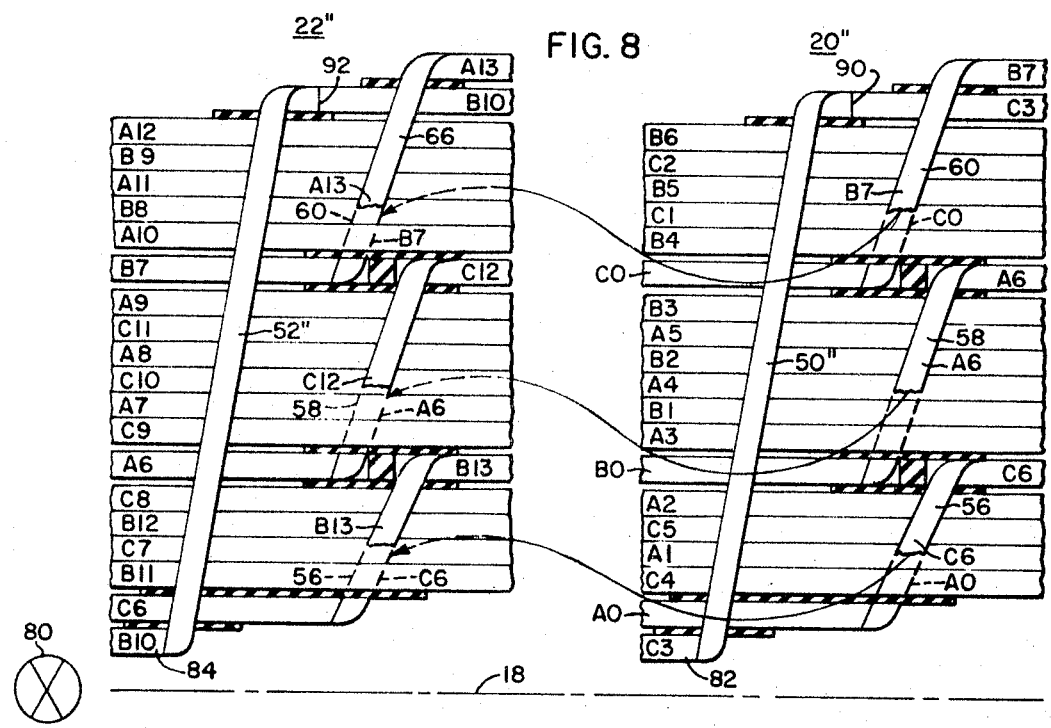

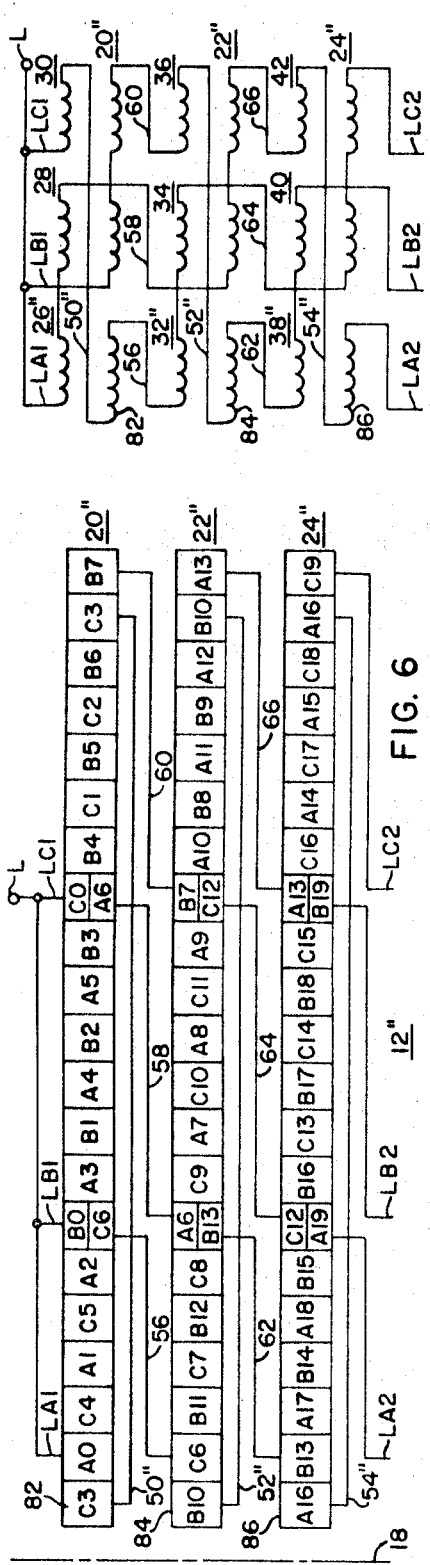
FIG. 7
FIG. 6
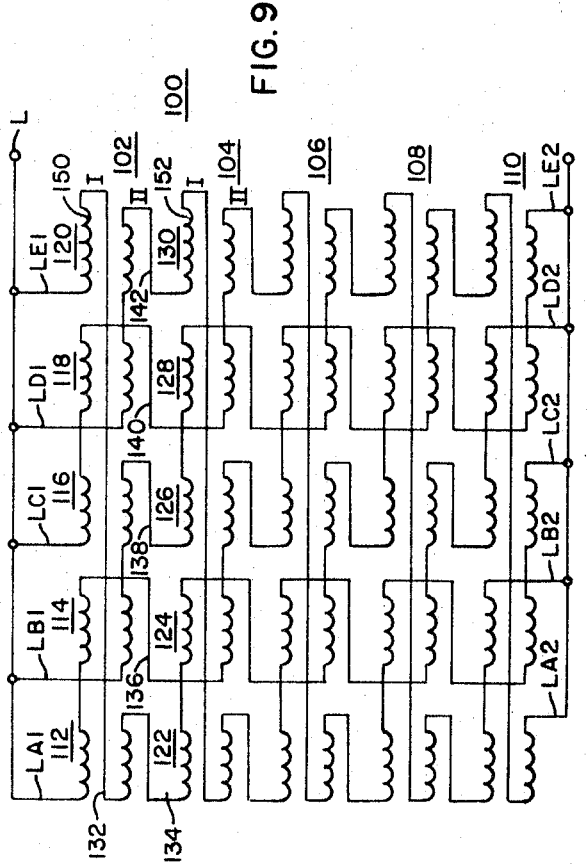
FIG. 9

United States Patent Office 3,460,084
Patented Aug. 5, 1969

3,460,084
INTERLEAVED ELECTRICAL WINDING STRUCTURES
Gerhard M. Stein, Sharon, Pa., assignor to Westinghouse Electric Corporation, Pittsburgh, Pa., a corporation of Pennsylvania
Filed Apr. 16, 1968, Ser. No. 721,732
Int. Cl. H01f 27/28
U.S. Cl. 336—187
14 Claims

ABSTRACT OF THE DISCLOSURE

An electrical winding assembly having a plurality of pancake type coils of the interleaved turn, high series capacitance type. Each pancake coil has inner, intermediate, and outer radial portions, each formed of two radially interleaved conductors which provide first and second interleaved sections in each radial portion. The sections of the radial portions, in each pancake coil, are interconnected, including a single, top-to-bottom interleaving connection which is disposed in the duct between adjacent pancake coils, to place turns from an electrically distant portion of the pancake coil between consecutive mechanically connected turns. Predetermined sections of adjacent pancake coils are interconnected to provide three separate series circuits through the winding, which circuits are interconnected at the start and finish of the winding. One of the sections in a predetermined radial portion, in each of the pancake coils, has one more section turn than the section it is interleaved with, which places one end of the interleaving connection adjacent the outer edge of each pancake coil, and allows the conductors which interconnect adjacent pancake coils to be radially aligned.

CROSS REFERENCE TO RELATED APPLICATION

This application relates to improvements in certain electrical winding structures disclosed in copending application Ser. No. 626,866, filed Mar. 29, 1967, now U.S. Patent 3,419,835 which is assigned to the same assignee as the present application.

BACKGROUND OF THE INVENTION

Field of the invention

The invention relates in general to electrical inductive apparatus, such as transformers, and more particularly to electrical windings of the interleaved turn high series capacitance type for such apparatus.

Description of the prior art

The hereinbefore mentioned related copending patent application discloses electrical windings having pancake coils of the interleaved turn, high series capacitance type, which utilize a plurality of conductive strands per pancake coil, only two of which need be wound together at any one time. This winding has as many parallel circuits as conductive strands, it is symmetrical, all of the pancake coils may be machine wound, it has only one top-to-bottom interleaving connection per pancake coil, and it transposes the relative positions of the circuits from pancake coil to pancake coil. Further, the circuits are connected to different radial portions of the pancake coil, to radially stagger the locations of the conductors entering each pancake coil.

In constructing an electrical winding according to these teachings, it is important that the structure be compact, and as strong electrically and mechanically as possible. Thus, the conductors which interconnect adjacent pancake coils should all be made in a single, radially aligned column, between two rows of radial spacers, regardless of the number of conductors to be connected in parallel in the winding, which arrangement provides the most compact assembly. This arrangement may be readily accomplished when an even number of conductive strands are to be connected in parallel. However, when an odd number of conductive strands are to be connected in parallel such as three, it has been found that it is not possible to radially align the interpancake connections without creating mechanical and electrical problems. For example, when the interpancake connections are located on the left side of the interleaving connection, when facing the side of the pancake coil on which the interleaving connection is placed, the conductor from the outer radial portion which is to be electrically connected to the outer radial portion of an adjacent pancake coil, and which is one turn further away from the coil axis than the turn connected to the interleaving connection, must continue on past the start of the interleaving connection, unsupported by a conductor from the other section of the radial portion, and therefore not interleaved with it, before it reaches the point where it starts an interpancake connection. This impairs the quality of the winding, creating an insulating problem between the interleaving connection and the conductor which passes radially over it, it introduces a discontinuity into the high series capacitance structure, which may increase the electrical stresses at this point during a surge potential, and it makes the interleaving connection inaccessible. The only brazed joint required per pancake coil is where the interleaving connection enters the section turn near the outer periphery of the pancake coil, and it is therefore desirable to keep this joint in the open at the outside edge of the pancake coil.

The problem is not solved by moving the location of the interleaving connection, relative to the interpancake connections, such that it is to the left of the interpancake connections. This alternative arrangement necessitates continuing one of the conductors which is connected to the interleaving connection, pass the start of an interpancake connection, unsupported and not interleaved with a conductor from the other section, which creates exactly the same problems hereinbefore described.

SUMMARY OF THE INVENTION

Briefly, the present invention discloses a new and improved electrical winding structure having an odd number of parallel circuits. The invention enables the teachings of the hereinbefore mentioned copending application to be used, while aligning the interpancake connections in a single radial column, without the attendant disadvantages of the prior art.

Specifically, the disadvantages of the prior art are overcome by adding an additional turn to a section of a predetermined radial portion, in each pancake coil. When the interleaving connection is located to the right of the interpancake connections, the additional section turn is added to a section in the outer radial portion of each pancake coil. When the interleaving connection is located to the left of the interpancake connection, the additional section turn is added to a section in the inner radial portion of the pancake coil. Adding the additional section turn, in each embodiment, allows all of the interpancake connections to be aligned in a single row, while being completely interleaved and supported by other conductors, and it places the interleaving connection and the joint to be brazed in an accessible location at the outer periphery of the pancake coil, facilitating the making of the brazed joint. Since a complete transposition of all of the parallel circuits is effected each time the circuits traverse as many pancake coils as there are parallel conductors, the additional section turn per pancake coil does not adversely affect the winding electrically.

3

BRIEF DESCRIPTION OF THE DRAWINGS

Further advantages and uses of the invention will become more apparent when considered in view of the following detailed description and drawings, in which:

FIGURE 1 is a fragmentary, cross-sectional diagrammatic view of a transformer having a high series capacitance winding structure which utilizes three conductors, mutually single interleaved pancake coils, constructed and interconnected according to the teachings of the prior art;

FIG. 2 is a schematic diagram of the high series capacitance winding structure shown in FIG. 1;

FIGS. 3, 4 and 5 are diagrammatic, schematic, and side views, respectively, of a high series capacitance winding having three conductor, mutually single interleaved pancake coils constructed according to the teachings of an embodiment of the invention;

FIGS. 6, 7 and 8 are diagrammatic, schematic, and side views, respectively, of a high series capacitance winding having three conductor, mutually single interleaved pancake coils constructed according to another embodiment of the invention; and FIG. 9 is a schematic diagram of a winding constructed according to the teachings of the invention which has five parallel connected circuits.

DESCRIPTION OF PREFERRED EMBODIMENTS

Referring now to the drawings, and FIG. 1 in particular, there is shown a fragmentary, cross-sectional view of a transformer 10, constructed according to the teachings of the prior art. Transformer 10, which is illustrated as being of the core-form type, has high and low voltage winding assemblies 12 and 14, respectively, concentrically disposed about a leg of a magnetic core 16. Since winding assemblies 12 and 14 are symmetrical about centerline 18, only the winding portion on one side of the centerline is shown in FIG. 1. Transformer 10 may be single or polyphase, and since each phase of a polyphase winding would be similar, only one phase is illustrated in order to simplify the drawing.

High voltage winding assembly 12 is of the type which includes a plurality of pancake type coils, such as pancake coils 20, 22 and 24, disposed in spaced, side-by-side relation, with their openings in alignment. Only three pancake coils are shown in FIG. 1, but it will be understood that as many pancake coils may be utilized as required by a specific application. Also, the number of conductor turns in the pancake coils may be varied as required by a specific application.

Pancake coils 20, 22 and 24, which are shown schematically in FIG. 2, are similar in construction, and have the desirable feature of being able to be machine wound while winding only two conductors together at any one time, regardless of the number of conductive strands to be connected in parallel. The interleaving method used in pancake coils 20, 22 and 24 is of the mutually single interleaved, mixed type. The word "mutual" indicates that a plurality of conductive strands are connected in parallel, in order to reduce eddy current losses, and that the parallel connected conductive strands are interleaved with each other. The word "single" indicates that there is one basic interleaving arrangement per pancake coil. The word "mixed" indicates the different parallel connected circuits successively occupy different positions from pancake coil to pancake coil, in order to effect a transposition of the parallel circuits and, therefore, a reduction in losses due to circulating currents.

The prior art mutually single interleaved, mixed type winding structure shown in FIGS. 1 and 2, in which all of the pancake coils may be machine wound, and which may be manufactured while winding only two conductive strands together at any one time, regardless of the number of parallel circuits in the winding, provides a compact winding assembly which is strong mechanically and electrically, when the winding is constructed with an even number of conductive strands connected in parallel. However, it has been found that when an odd number of conductive strands are to be connected in parallel, it is not possible to achieve the same strong compact structure. For example, in order to simplify manufacturing, and thus reduce the time and cost of manufacturing the winding, as well as provide the most compact structure, it is desirable for all of the interpancake connections to be aligned in a single colume between two rows of radial spacers. The arrangement is easily accomplished when the pancake coils each have an even number of parallel circuits, but it introduces mechanical and electrical problems when the pancake coils have an odd number of parallel circuits. Since many power ratings require three parallel circuits through the winding, the use of the mutually single interleaved, mixed type winding is severely limited in its application.

In order to better understand the improvement to this type of winding disclosed by the teachings of this invention, the prior art three conductors mutually single interleaved, mixed type winding is shown in FIGS. 1 and 2, and will now be described in detail.

Each of the pancake coils 20, 22 and 24 have inner, intermediate and outer radial portions, so divided as each of these radial portions are formed from a different pair of conductors, radially interleaved together. The two conductors in each radial portion form first and second interleaved sections, referenced I and II, respectively. Since the winding may be visualized as being spirally wound with two radially interleaved conductors, which would create two radially interleaved sections, and each section then severed twice to provide the three radial portions, the sections of each radial portion have been given the same section number as though they had been originally wound from a single conductor. Thus, as shown in FIG. 1, section I of each of the radial portions appears at every other turn, and section II of each of the radial portions appears at the remaining conductor turns. Further, in FIG. 2, the first sections I of all of the radial portions are disposed in a first vertical column, and the second sections II are in the immediately adjacent vertical column.

Each section in each radial portion has an inner or "start" end, and an outer or "finish" end, referenced radially outward from the center line 18.

Pancake coil 20 includes inner, intermediate, and outer radial portions 26, 28 and 30, respectively, each having radially interleaved sections I and II, pancake coil 22 includes inner, intermediate and outer radial portions 32, 34 and 36, respectively, each having radially interleaved sections I and II, and pancake coil 24 includes inner, intermediate and outer radial portions 38, 40 and 42, respectively, each having radially interleaved sections I and II.

Each pancake coil has the outer or finish end of one of its sections in the outer radial portion connected to the inner or start end of the other section in the inner radial portion. This connection, which is a top-to-bottom connection, transversing the radial build of the pancake coil, is called the interleaving connection. Thus, if the first section in the outer radial portion is selected, it is connected to the second section of the inner radial portion. The interleaving connections in pancake coils 20, 22 and 24, are given the reference numerals 50, 52 and 54, respectively.

Sections I of the inner and intermediate radial portions are interconnected, with the outer end of section I of the inner radial portion being connected to the inner end of section I of the intermediate radial portion. Thus, in practice, these two sections may be formed from a single unsevered conductor. Sections II in the intermediate and outer radial portions are interconnected, with the outer end of section II of the intermediate radial portion being connected to the inner end of section II of the outer radial portion. Thus, in practice, these two sections may be formed from a single unsevered conductor.

The intersection connections in each pancake coil leave unconnected start or inner ends in section I of the inner radial portion, section II of the intermediate radial portion, and section I of the outer radial portion; and unconnected outer or finish ends in section II of the inner radial portion, section I of the intermediate radial portion, and section II of the outer radial portion. The three parallel circuits in winding 12 enter each pancake coil at the unconnected inner or start ends of the sections, and leave from the unconnected outer or finish ends of the sections.

Interpancake connections are made between like radial sections of adjacent pancake coils. For example, the unconnected outer end of section II of the inner radial portion of one pancake coil is connected to the unconnected inner end of section I of the inner radial portion of the next adjacent pancake coil, the unconnected outer end of section I of the intermediate radial portion of one pancake coil is connected to the unconnected inner end of section II of the intermediate radial portion of the next adjacent pancake coil, and the unconnected outer end of section II in the outer radial portion of one pancake coil is connected to the unconnected inner end of section I of the outer radial portion of the next adjacent pancake coil. Thus, each interpancake connection is directed through the duct space between adjacent pancake coils, and each traverses the radial build of its associated radial portion of the pancake coil.

Specifically, the interpancake connection between the inner, intermediate and outer radial portions of pancake coils 20 and 22 are referenced 56, 58 and 60, respectively, and the interpancake connections between the inner, intermediate and outer radial portions of pancake coils 22 and 24 are referenced 62, 64 and 66, respectively.

To illustrate that the interleaving arrangement for the high voltage winding 12 shown in FIGS. 1 and 2 produces a transposition of the circuits from pancake coil to pancake coil, and that each circuit occupies each strand position after traversing three consecutive pancake coils, the three parallel circuits through winding 12 will be called the A, B and C circuits, and their progress through the pancake coils 20, 22 and 24 is indicated in FIG. 1 by giving each section turn a letter corresponding to the circuit it is located in, and a number which indicates the number of section turns from the start end of the winding.

The A, B and C circuits enter pancake coil 20 at the inner end of section I of the inner radial portion 26, at the inner end of section II of the intermediate radial portion 28, and at the inner end of section I of the outer radial portion 30, via conductors LA1, LB1 and LC1, respectively. If pancake coil 20 is the first coil at the start of the winding 12, conductors LA1, LB1 and LC1 are connected in common to line terminal L.

The A circuit spirals outwardly through section I of the inner and intermediate radial portions 26 and 28, respectively, leaves pancake coil 20 via conductor 58, enters the inner end of section II of the intermediate radial portion 34 of pancake coil 22, spirals outwardly through section II of the intermediate and outer radial portions 34 and 36, respectively, leaves pancake coil 22 via conductor 66, enters the inner end of section I of the outer radial portion 42 of pancake coil 24, spirals outwardly to the end of this section, leaves this section via interleaving connection 54, enters the inner end of section II of the inner radial portion 38, spirals outwardly through this section, and leaves pancake coil 24 via conductor LA2. This pattern for the A circuit would then be repeated for each successive set of three pancake coils. It will be noted that the A circuit has traversed every section of all three radial portions, after completing three pancake coils.

In like manner, the B circuit traverses section II of intermediate and outer radial portions 28 and 30 of pancake coil 20, it proceeds to pancake coil 22 via conductor 60, where it enters section I of outer radial portion 36, it proceeds to the inner end of section II of the inner radial portion 32 of pancake coil 22, via the interleaving connection 52, it proceeds to pancake coil 24 via conductor 62 where it traverses section I of the inner and intermediate radial portions 38 and 40, respectively, and it leaves pancake coil 24 via conductor LB2.

Similarly, the C circuit enters the inner end of section I of the outer radial portion 30 of pancake coil 20, it proceeds via interleaving connection 50 to the inner end of section II of the inner radial portion 26 of pancake coil 20, it proceeds to pancake coil 22 via conductor 56, and traverses section I of the inner and intermediate radial portions 32 and 34, respectively, it proceeds to pancake coil 24 via interpancake connection 64, it traverses section II of the intermediate and outer radial portions 40 and 42, respectively, and it leaves pancake coil 24 via conductor LC2.

After the A, B and C circuits have traversed all of the coils of winding 12, they will be connected in common at the finish end of the winding, to complete the parallel connection of the circuits.

Since winding 12 has three parallel connected strands, a complete transposition of the three circuits is achieved after traversing three pancake coils. If winding 12 were to have a different number of parallel connected strands, a complete transposition would be achieved after traversing as many pancake coils as there are conductive strands connected in parallel.

While there are three separate circuits in each pancake coil, only two conductive strands need be wound together at any one time. For example, in pancake coil 20, the A and C conductive strands are wound together for the first one-third of the coil build, each having a like number of turns, the A and B conductive strands are wound together for the next one-third of the coil build, each having a like number of turns, and the B and C conductive strands are wound together for the last one-third of the coil build dimension, each having a like number of turns.

It should be noted that this winding method requires only one brazed joint per pancake coil, between the outer end of section I of each outer radial portion, and the interleaving connection. For example, in winding pancake coil 20, a sufficient length of conductor is unwound to form the interleaving connection 50 before starting to wind the A and C conductors together. After completing the inner radial portion, the C conductor is dropped to the mandrel to await the start of pancake coil 22, and the conductor which is to start the B circuit is then spirally wound with the continuation of the conductor from the A circuit from the inner radial portion of the winding. The intermediate radial portion of the winding is then wound using the A and B conductive strands, and at the conclusion of the intermediate radial portion, the conductor from the A circuit is laid aside to await the winding of pancake coil 22, and the conductor which is to start the C circuit is spirally wound with the continuation of the conductor from the B circuit, to form the outer radial portion of the pancake coil. After the outer radial portion is formed, the conductor from the C circuit is severed and brazed to conductor 50, to interconnect the two C circuit sections of the pancake coil, and the conductor from the B circuit is laid aside to await the winding of pancake coil 22.

As shown in FIG. 1, in which the coil turns of the A, B and C circuits are each numbered consecutively, starting at their entry into the pancake coil, there is an A, B and C circuit at each like turn in the three pancake coils 20, 22 and 24. Further, the interleaving of the three circuits in each pancake coil has been accomplished in a symmetrical manner, with each pancake coil being similar to all of the other pancake coils, with only three interconnecting leads between adjacent pancake coils, and one interleaving connection in each pancake coil.

As hereinbefore explained, it is desirable to readily align the interpancake connections in a single column across the coil build dimension, such as interpancake connections 56, 58 and 60 between pancake coils 20 and 22. This, however, cannot be accomplished using the teachings of the prior art, for windings having an odd number of parallel connected circuits, without deleteriously affecting the winding, both electrically and mechanically. FIGS. 3, 4 and 5 are diagrammatic, schematic and side views, respectively, which illustrate a high voltage winding constructed according to the teachings of an embodiment of the invention, which overcome these prior art disadvantages. Components in FIGS. 3, 4 and 5 which are similar to those in FIGS. 1 and 2, are given like reference numerals, and components in FIGS. 3, 4 and 5 which perform the same functions as those in FIGS. 1 and 2, but which may not be identical, are given like reference numerals with a prime mark.

Specifically, FIGS. 3 and 4 illustrate a high series capacitance winding 12', which is a three conductor mutually single interleaved, mixed type winding, similar to winding 12 hereinbefore described. However, instead of the sections in the outer radial portion having the same number of turns, the section which is connected to the interleaving connection is provided with an additional turn. The additional turn is added to the outer radial portion of each pancake coil, in this embodiment of the invention, since, as illustrated in the fragmentary side view of coils 20' and 22' in FIG. 5, the interleaving connection is disposed on the right of the interpancake connections. In other words, if circle 80 represents the position of the winding machine operator, the interpancake connections are closed to the operator than the interleaving connection.

Specifically, section I of outer radial portion 30' of pancake coil 20' is given an additional turn 70, which appears as turn C4 in FIG. 3; section I of the outer radial portion 36' of pancake coil 22' is given an additional turn 72, which appears as turn B10 in FIG. 3; and, section I of the outer radial portion 42' of pancake coil 24' is given an additional turn 74, which appears as turn A16 in FIG. 3. These additional section turns at the outer periphery of the pancake coils moves the interleaving connection to the outer section turn, instead of its entering the next to the outermost, turn, as shown in the prior art winding 12 of FIG. 1.

FIG. 5 clearly illustrates the disadvantages of having the interleaving connection 50' enter turn C3. If the interpancake connections are radially aligned as shown in FIG. 5, turn B6 would continue on past the entrance of the interleaving connection 50' into turn C3. Thus, a portion of turn B6 would be unsupported, creating an insulation problem between turns B6 and C3 at this point, and also the portion of turn B6 extending past the interleaving connection 50' would not be interleaved with a conductor from the other section of the radial portion, which would create a discontinuity in the high series capacitance effect. Discontinuities of this nature in the high series capacitance structure may create high electrical stresses and oscillations when a surge potential is applied to the winding, which may eventually cause failure of the winding.

By adding the additional turn 70 to the section of the outer radial portion which is connected to the interleaving connection, the interpancake connections may all be radially aligned in a single column, and each conductor completely supported and interleaved with a conductor from the opposite section of the radial portion. Further, as illustrated in FIG. 3, the additional section turn is successively in the C, B and A circuits, in pancake coils 20', 22', and 24'. Thus, a complete transposition of the A, B and C circuits is still achieved after completing three pancake coils. Still further, the single joint per pancake coil which is to be brazed, such as the joints 76 and 78 in pancake coils 20' and 22', as shown in FIG. 5, are accessible at the outer periphery of the pancake coils.

FIGS. 6, 7 and 8 are diagrammatic, schematic and side views, respectively, of a winding 12" constructed according to the teachings of another embodiment of the invention wherein the interleaving connection is located to the left of the interpancake connections. In other words, the interleaving connection is towards the winding machine operator 80, relative to the location of the interpancake connections. In this embodiment of the invention, an additional section turn is provided in the section of the inner radial portion which is connected to the interleaving connection.

Specifically, section II of the inner radial portion 26" of pancake coil 20" is provided with an additional turn 82, which appears as turn C3 in FIG. 6; section II of the inner radial portion 32" of pancake coil 22" is provided with an additional turn 84, which appears as turn B10 in FIG. 6; and, section II of the inner radial portion 38" of pancake coil 24" is provided with an additional turn 86, which appears as turn A16 in FIG. 6. This additional turn moves the interleaving connection to the innermost turn of the pancake coil. For example, as shown in FIG. 6, the interleaving connection 50" of pancake coil 20" enters the turn referenced C3, instead of the turn referenced C4. If the interleaving connection were to enter turn C4, which corresponds to the position of turn C3 in the prior art of FIG. 1, conductor A0 would be unsupported and non-interleaved as it proceeds circumferentially past the end of the section turn connected to the interleaving connection. By providing the additional turn in this inner radial section, support and interleaving is provided for this fractional turn as it proceeds to the point of making the interpancake connection.

The additional section turn provided in each pancake coil, in either embodiment of the invention, thus provides support for all of the conductive strands, and provides complete interleaving for all of the conductive strands in all of the radial portions, allowing a compact winding structure to be provided wherein the interpancake connections are radially aligned, without creating the electrical and mechanical problems of the prior art.

While the two embodiments of the invention have been illustrated and described relative to three conductor windings, which are the most commonly used of windings having an odd plurality of parallel circuits, the invention applies equally to any odd numbered plurality of parallel connected conductors in a mutually single interleaved, mixed type winding as disclosed herein. For example, FIG. 9 is a schematic diagram of a winding 100 having five parallel connected circuits, which provide five radial portions in each pancake coil.

More specifically, winding 100 includes pancake coils 102, 104, 106, 108 and 110. Five pancake coils are illustrated since in a winding having five parallel connected strands, it requires five pancake coils to provide a complete transposition of all of the circuits. Each of the pancake coils has five radial sections, each formed by a different radially interleaved pair of conductive strands. For example, pancake coil 102 has radial portions 112, 114, 116, 118 and 120 and pancake coil 104 has radial sections 122, 124, 126, 128 and 130. Each of the radial sections in each of the pancake coils has first and second radially interleaved sections I and II, respectively, provided by the two radially interleaved conductors in each section. The method of interconnecting the sections in each pancake coil, and interconnecting adjacent pancake coils, is the same as herein before described relative to the three conductor embodiments. Further, as described relative to the three conductor embodiments, one of the sections in a radial portion adjacent one of the edges of the pancake coil has one more turn than the section it is interleaved with. The radial portion selected to have the additional section turn is determined by the relative positions of the interleaving connection and the interpancake connections. If the interpancake connections are closer to the winding operator than the interleaving connection, the additional turn will be disposed in the outermost radial portion. If the interleaving connection is closer to the winding machine operator than the interpancake connections, the additional turn will be placed in the innermost radial portion. In FIG. 9, the additional turn is placed in the outermost radial portion, with section I of radial portion 120 of pancake coil 102 having an additional turn 150, and section I of radial portion 130 of pancake coil 104 having an additional turn 152. In like manner, the remaining pancake coils would also have a similarly disposed additional turn. The sections are interconnected within each pancake coil by connecting the outer turn in the outermost radial portion to the inner turn of the opposite section in the innermost radial portion, with the section selected in one of the radial portions being the section having the additional turn. As illustrated in FIG. 9, section I of radial portion 120 of pancake coil 102 has its outer turn connected via interleaving connection 132 to the inner turn of section II of radial portion 112. The remaining sections I are connected in pairs, with sections I of radial portions 112 and 114 being connected together and sections I of radial portions 116 and 118 being connected together. In like manner, the remaining sections II of the radial portions are connected in pairs, with sections II of radial portions 114 and 116 being connected together, and sections II of radial portions 118 and 120 being connected together. This leaves an unconnected inner end of a section in each radial portion, and an unconnected outer end of a section in each radial portion. Each of the circuits, which may be called the A, B, C, D and E circuits, enter the unconnected inner ends of the sections, with the A circuit entering the inner end of section I of radial portion 112 via conductor LA1, the B circuit entering the inner end of section II of radial portion 114 via conductor LB1, the C circuit entering the inner end of section I of radial portion 116 via conductor LC1, the D circuit entering the inner end of section II of radial portion 118 via conductor LD1, and the E circuit entering the inner end of section I of radial portion 120, via conductor LE1. If pancake coil 102 is the first coil at the start of the winding, conductors LA1, LB1, LC1, LD1 and LE1 will be connected in common to the line terminal L. The unconnected outer ends in each of the radial portions of the pancake coils are connected to unconnected inner ends of a like disposed radial portion of the next adjacent pancake coil. For example, the outer end of section II of radial portion 112 of pancake coil 102 is connected to the inner end of section I of radial portion 122 of pancake coil 104 via interpancake connection 134. The remaining radial portions are interconnected in like manner via interpancake connections to be radially aligned while providing support for all of the conductors, and interleaving all of the conductors of the two sections with one another, as hereinbefore described relative to the three conductor embodiment.

In summary, the teachings of the invention allow the mutually singly interleaved, mixed type winding disclosed in the hereinbefore mentioned copending patent application, to be utilized when an odd number of parallel circuits are desired in the winding. Thus, the usefulness of this winding has been greatly extended, without adding significantly to the cost of the winding, and without deleteriously affecting its mechanical and electrical characteristics.

Since numerous changes may be made in the above-described apparatus and different embodiments of the invention may be made without departing from the spirit thereof, it is intended that all matter contained in the foregoing description, or shown in the accompanying drawings, shall be interpreted as illustrative and not in a limiting sense.

I claim as my invention:

1. An electrical winding structure having first and second ends, comprising:
   a plurality of pancake coils disposed in spaced, side-by-side relation,
   each of said pancake coils having an odd numbered plurality of radial portions, each having a pair of radially interleaved conductive strands which provide first and second interleaved sections having inner and outer ends,
   one of the interleaved sections in a radial portion at an edge of the pancake coil having one more turn than the section it is interleaved with,
   the first and second sections in the remaining radial portions each having a like number of turns,
   first means connecting the outer and inner ends of the first and second sections of the outermost and innermost radial portions, respectively, with one of the interconnected sections being the section having one more turn than the section it is interleaved with,
   second means connecting the remaining first sections in pairs connecting their adjacent ends,
   third means connecting the remaining second sections in pairs by connecting their adjacent ends,
   fourth means interconnecting adjacent pancake coils, with the unconnected outer ends of the sections in the plurality of radial portions in one pancake coil being connected to the unconnected inner ends of the sections of like positioned radial portions of the next adjacent pancake coil, respectively, to provide an odd numbered plurality of parallel circuits through the winding,
   and fifth and sixth means interconnecting said plurality of circuits at the first and second ends of the winding, respectively.

2. The electrical winding structure of claim 1 wherein said fourth means includes as many conductors as there are parallel circuits in the winding, with said conductors being substantially radially aligned between each adjacent pair of pancake coils.

3. The electrical winding structure of claim 1 wherein the radial portion in which the section which has one more turn than the section it is interleaved with, is the outermost radial portion, and said first means is connected to the section in the innermost radial portion which starts the next to the innermost turn.

4. The electrical winding structure of claim 1 wherein the radial portion in which the section which has one more turn than the section it is interleaved with, is the innermost radial portion, and said first means is connected to the section in the innermost radial portion which starts the innermost turn.

5. An electrical winding structure having first and second ends, comprising:
   a plurality of pancake coils disposed in spaced side-by-side relation,
   each of said pancake coils having inner, intermediate and outer radial portions, each having first and second radially interleaved conductors which provide first and second interleaved sections, respectively, each having inner and outer ends, the first and second sections of said inner radial portion having a like number of conductor turns, the first and second sections of said intermediate radial portion having a like number of conductor turns, and the first section of said outer radial portion having one more turn than the second section of said outer radial portion,
   first means interconnecting the outer and inner ends of predetermined sections in said inner and intermediate radial portions, respectively, in each of said pancake coils,
   second means connecting the outer end of the unconnected section in the intermediate radial portion to the inner end of a predetermined section in the outer radial portion, in each of said pancake coils,
   third means connecting the inner end of the unconnected section in the inner radial portion to the outer end of the unconnected section in the outer radial portion, in each of said pancake coils, fourth means interconnecting adjacent pancake coils, with the unconnected outer ends of the sections in the inner, intermediate and outer radial portions in one pancake coil being connected to the unconnected inner ends of the sections in the inner, intermediate and outer radial portions, respectively, in an adjacent pancake coil, to provide three separate circuits through the winding, and fifth and sixth means interconnecting said three separate circuits at the first and second ends of the winding, respectively.

6. The electrical winding structure of claim 5 wherein said fourth means includes first, second and third conductor means, which interconnect the outer and inner ends of predetermined sections in said inner, intermediate and outer radial portion of adjacent pancake coils, respectively, said first, second and third conductor means being substantially radially aligned.

7. The electrical winding structure of claim 5 wherein the first section starts the innermost conductor turn of each of the radial sections, with said third means connecting the inner end of the second section of the inner radial portion with the outer end of the first section of the outer radial portion.

8. The electrical winding of claim 5 wherein said first means interconnects the first sections of said inner and intermediate radial portions, said second means interconnects the second sections of said intermediate and outer radial portions, and said third means interconnects the second section of the inner radial portion with the first section of the outer radial portion.

9. The electrical winding of claim 8 wherein said fourth means includes first, second and third conductor means which interconnect unlike sections in said inner, intermediate and outer radial portions, respectively, said first, second and third conductor means being substantially radially aligned.

10. An electrical winding structure having first and second ends, comprising:

a plurality of pancake coils disposed in spaced, side-by-side relation, each of said pancake coils having inner, intermediate and outer radial portions, each having first and second radially interleaved conductors which provide first and second interleaved sections, respectively, each having inner and outer ends, the first and second sections of said outer radial portion having a like number of conductor turns, the first and second sections of said intermediate radial portion having a like number of conductor turns, and the first section of said inner radial portion having one more turn than the second section of said inner radial portion, first means interconnecting the outer and inner ends of predetermined sections in said inner and intermediate radial portions, respectively, in each of said pancake coils, second means connecting the outer end of the unconnected section in the intermediate radial portion to the inner end of a predetermined section in the outer radial portion, in each of said pancake coils, third means connecting the inner end of the unconnected section in the inner radial portion to the outer end of the unconnected section in the outer radial portion, in each of said pancake coils, fourth means interconnecting adjacent pancake coils, with the unconnected outer ends of the sections in the inner, intermediate and outer radial portions in one pancake coil being connected to the unconnected inner ends of the sections in the inner, intermediate and outer radial portions, respectively, in an adjacent pancake coil, to provide three separate circuits through the winding, and fifth and sixth means interconnecting said three separate circuits at the first and second ends of the winding, respectively.

11. The electrical winding structure of claim 10 wherein said fourth means includes first, second and third conductor means which interconnect the outer and inner ends of predetermined sections in said inner, intermediate and outer radial portions of adjacent pancake coils, respectively, said first, second and third conductor means being substantially radially aligned.

12. The electrical winding structure of claim 10 wherein the first section starts the innermost conductor turn of each of the radial sections, with said third means connecting the inner end of the first section of the inner radial portion with the outer end of the second section of the outer radial portion.

13. The electrical winding of claim 10 wherein said first means interconnects the first sections of said inner and intermediate radial portions, said second means interconnects the second sections of said intermediate and outer radial portions, and said third means interconnects the second section of the inner radial portion with the first section of the outer radial portion.

14. The electrical winding of claim 13 wherein said fourth means includes first, second and third conductor means which interconnect unlike sections in said inner, intermediate and outer radial portions, respectively, said first, second and third conductor means being substantially radially aligned.

References Cited

UNITED STATES PATENTS

| | | | |
|---|---|---|---|
| 3,299,385 | 1/1967 | Stein | 336—70 |
| 3,391,364 | 7/1968 | Stein et al. | 336—70 |

BERNARD A. GILHEANY, Primary Examiner

H. B. GILSON, Assistant Examiner